(12) United States Patent
Mayer et al.

(10) Patent No.: US 7,738,798 B2
(45) Date of Patent: Jun. 15, 2010

(54) OPTICAL DIFFERENTIAL-PHASE-SHIFT-KEYED DEMODULATOR APPARATUS AND METHOD

(75) Inventors: Richard C. Mayer, St. Louis, MO (US); Chester L. Balestra, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 593 days.

(21) Appl. No.: 11/684,970

(22) Filed: Mar. 12, 2007

(65) Prior Publication Data

US 2008/0226300 A1    Sep. 18, 2008

(51) Int. Cl.
*H04B 10/06* (2006.01)

(52) U.S. Cl. ...................................... 398/212

(58) Field of Classification Search .......... 398/212–213
See application file for complete search history.

(56) References Cited

U.S. PATENT DOCUMENTS 6,834,146 B2   12/2004 Rockwell et al.
7,006,725 B2   2/2006 Conway et al.
7,092,641 B2 * 8/2006 Windover .................... 398/186

OTHER PUBLICATIONS

Atia et al, Demonstration of Return-to-zero Signaling in Both OOk and DPSK Formats to improve . . . Optically Preamplified Receiver, LEOS, Nov. 1999,, p. 226-227.*

* cited by examiner

*Primary Examiner*—Leslie Pascal
(74) *Attorney, Agent, or Firm*—Harness, Dickey & Pierce, P.L.C.

(57) ABSTRACT

A system and method for demodulating an optical differential-phase-shift-keyed (DPSK) input signal using a Fabray-Perot etalon filter. In one embodiment the system receives a transmitted wavefront from the etalon filter and uses a detector to generate an electrical waveform from the transmitted wavefront. A comparator is used to receive an output from the detector and to generate a signal in accordance with each phase shift (i.e., bit transition) in the optical DPSK input signal. A latching flip-flop receives an output from the comparator and generates a digital signal representative of the bit pattern of the DPSK input signal. The system and method does not require the precisely matched dual optical paths of a Mach-Zehnder interferometer, and therefore is substantially less susceptible to thermal effects that could influence the operation of a conventional Mach-Zehnder interferometer in DPSK demodulation operations.

16 Claims, 6 Drawing Sheets

OPTICAL DIFFERENTIAL-PHASE-SHIFT-KEYED DEMODULATOR APPARATUS AND METHOD

FIELD

The present disclosure relates to demodulators used with optical differential-phase-shift-keyed (DPSK) communication, and more particularly to an interferometer of less complex construction that is able to demodulate an optical DPSK signal without the need for optical path length control schemes that need to be matched exactly to the data rate, and that might compromise performance of the interferometer.

BACKGROUND

Optical Differential-Phase-Shift-Keyed (DPSK) demodulators have traditionally been formed by using the well known Mach-Zehnder interferometer. This device has essentially two "arms" that form distinct optical paths that are used to detect phase shifts in the optical DPSK signal. The Mach-Zehnder interferometer requires a physical length that is determined by the data rate of the communication link with which it is being used. The two arms of the Mach-Zehnder interferometer must maintain a differential optical path length equal to the distance that light travels in one bit period. As a result, it is highly sensitive to temperature and other environmental factors that cause variations in the physical dimensions of the optical components that it uses.

To address the undesirable influence that thermal factors have on the performance of present day Mach-Zehnder interferometers that are used in DPSK optical demodulator applications, these devices have typically employed a control loop to regulate the path length of one of the optical paths. As will be appreciated, this adds significantly to the complexity and cost of the interferometer.

Other apparatuses and methods for demodulating a DPSK optical signal have involved optical filter discriminator approaches that attempt to detect the phase shift changes in the bit pattern of the optical DPSK signal. However, such approaches typically only use the transmitted wavefront portion of the input optical signal, and not the larger reflected energy provided by the reflected wavefront component of the signal. Such approaches further typically do not attempt to make use of both the transmitted and reflected energy components of the optical DPSK signal. Using both the transmitted and reflected energy 1) increases the received signal, and 2) improves the signal-to-noise ratio, since common-mode noise of the dual detectors is cancelled out. Time alignment of the transmitted and received pulses is less difficult than alignment of the two arms of a Mach-Zehnder demodulator.

SUMMARY

The present system and method is directed to a system for demodulating an optical DPSK signal that is more sensitive and less complex and less costly construction than other forms of optical demodulator systems.

In one embodiment the system makes use of a Fabry-Perot etalon filter for receiving an optical DPSK input signal and generating a wavefront component therefrom each time a phase shift occurs in the optical DPSK input signal. A detector system detects the wavefront component output from the etalon filter to enable bit transitions in a data sequence of the optical DPSK input signal to be detected, and the optical DPSK input signal to be reconstructed as a digital output signal. A comparator is used to compare the electrical signal with a reference threshold signal, and an output of the comparator is used to signal a phase shift (i.e., bit transition) in the optical DPSK input signal. A logic component receives an output of the comparator and generates a digital output signal indicative of the bit pattern of the optical DPSK signal.

In another embodiment the detector system makes use of a first detector for receiving a transmitted wavefront component of the optical DPSK input signal, and a second detector for receiving a reflected wavefront component of the DPSK input signal. A comparator receives the output from each detector and generates a signal indicative of a phase shift in the wavefronts of the signals output from the etalon filter. The signal path lengths relative to the comparator are matched during initial construction of the system. The comparator output is fed to an edge-triggered logic component, which may comprise a latching flip-flop that generates a digital output signal indicative of the bit pattern of the optical DPSK signal. The physically small size of the etalon filter serves to significantly reduce or substantially eliminate the susceptibility of the etalon filter to thermal changes that could significantly affect the performance of a conventional Mach-Zehnder interferometer.

The various embodiments and methods of the present disclosure are substantially unaffected by thermal changes that typically adversely affect performance of other dual arm demodulator systems. The present system and method is expected to find utility in both free-space and optical fiber implementations.

Further areas of applicability will become apparent from the description provided herein. It should be understood that the description and specific examples are intended for purposes of illustration only and are not intended to limit the scope of the present disclosure

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
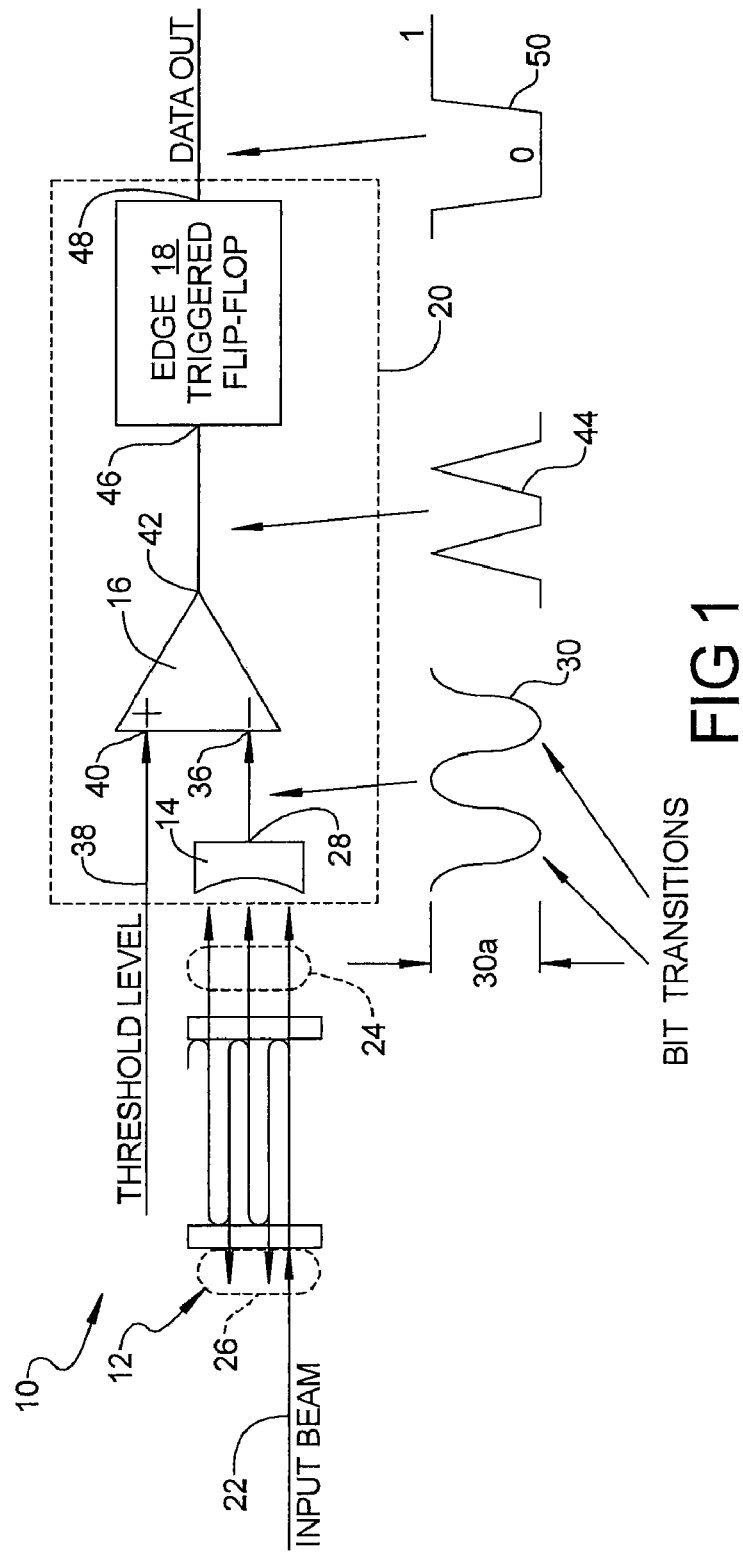
FIG. 1 is a simplified block diagram of one embodiment of an optical DPSK demodulator in accordance with the present disclosure.

Referring to FIG. 1, an optical differential-phase-shift-keyed (DPSK) demodulator system 10 is illustrated in accordance with one embodiment of the present disclosure. The system 10 includes, in this example, a Fabry-Perot etalon filter 12, an optical detector 14, a comparator 16, and a latching, edge triggered flip-flop 18. Components 14, 16 and 18 may be viewed as collectively comprising a detector system 20. The Fabry-Perot etalon filter 12 will be referred to as the "etalon filter 12" for discussion purposes.

The etalon filter 12 receives an optical DPSK input signal 22 and generates a transmitted wavefront 24 and a reflected wavefront 26 therefrom. The transmitted wavefront 24 is directed to an input of the detector 14, such as a high-speed InGaAs detector. The detector 14 produces an electrical output signal at an output 28, indicated by waveform 30. As long as no phase shifts (i.e., bit transitions) occur in the optical DPSK input signal 22 data sequence, the amplitude 30a of the transmitted wavefront 24 is constant. However, when a phase shift of 180 degrees (corresponding to a bit transition) occurs in the optical DPSK input signal 22 data sequence, a decreased-intensity pulse occurs on the transmitted wavefront 24, while a corresponding increased-intensity pulse occurs on the reflected wavefront 26. The width of pulse depends on the finesse (i.e., resolution) of the etalon filter 12.

Figure 2:
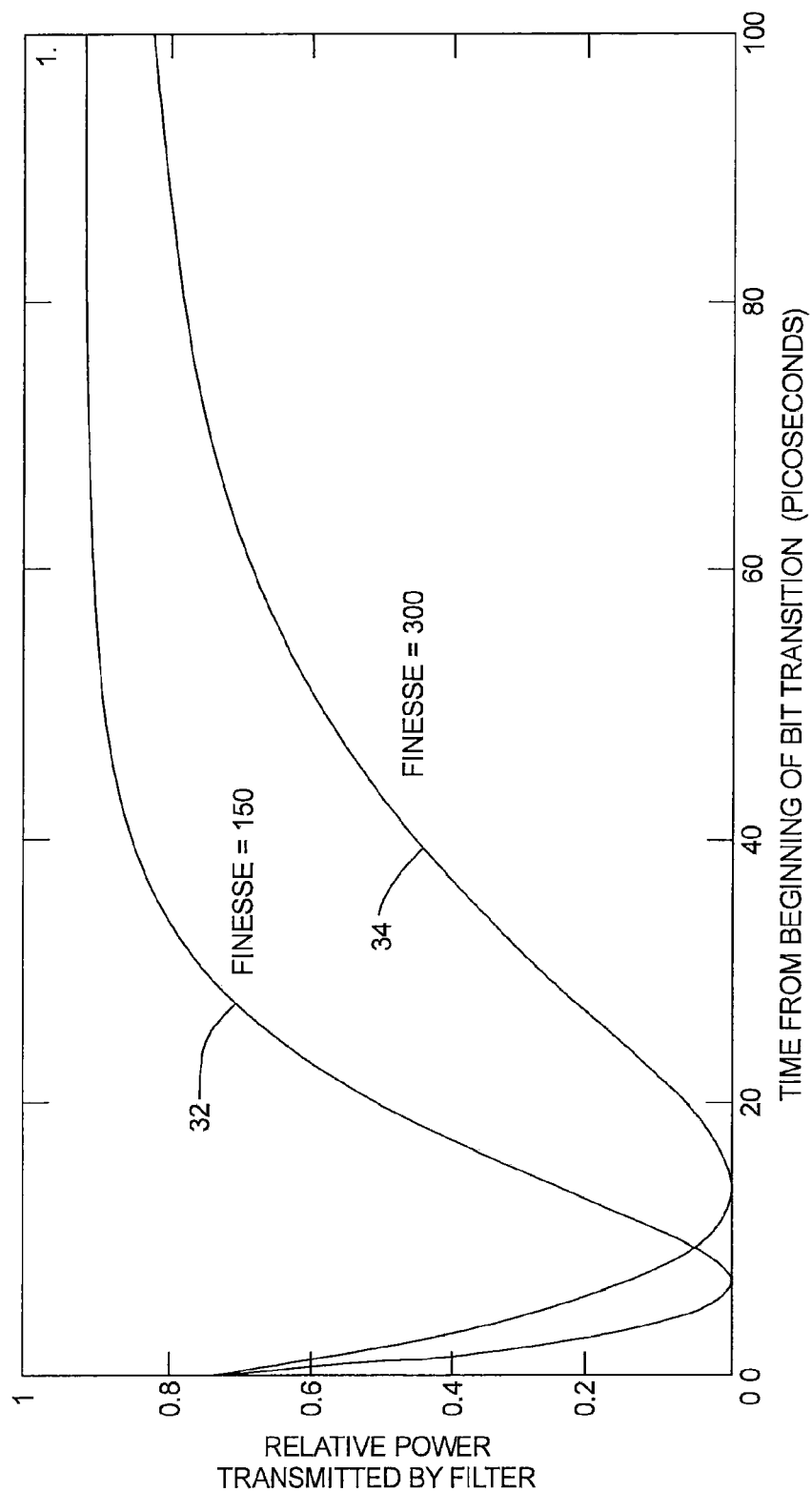
FIG. 2 shows a graph of two exemplary waveforms that illustrate the difference in the output of the etalon filter of FIG. 1 for two different levels of finesse of the etalon filter (The desired width is a function of the data rate; the effect of one transition should be gone before the next transition can occur)

With brief reference to FIG. 2, curves 32 and 34 illustrate two different waveforms produced by a carrier wave length at approximately 1550 nanometers for two different values of etalon filter 12 finesse. The filter finesse of a value of 150 produces the curve 32, which represents an output signal from the etalon filter 12. The signal represented by curve 32 forms a significantly narrower pulse with less energy than the output signal represented by curve 34, which is produced with a finesse value of 300. However, the narrower pulse may have a better signal-to-noise ratio. The pulse width should be optimized for the best signal-to-noise ratio for the desired data rate, within the practical constraints of producing high finesse filters.

With further reference to FIG. 1, the electrical waveform 30 at the output 28 of the detector 14 is fed into the inverting input 36 of the comparator 16. A reference threshold level signal 38 is applied to the non-inverting input 40 of the comparator 16. The output 42 of the comparator 16 may be a logic "0" level signal when the magnitude of the signal on the non-inverted input 36 is less than the value of the threshold level signal 38 on the inverting input 40. For example, this might produce a logic "0" output signal on the output 42 of the comparator 16. However, when the value of the signal 30 on the inverting input 36 increases beyond the threshold level signal 38 on the non-inverting input 40, the output 42 of the comparator 16 may go to a logic level "1" value. The output waveform 44 present on the output 42 of the comparator 16 forms a digital saw-toothed waveform, as shown in FIG. 1.

When the output waveform 44 on output 42 changes to a logic 1 level, the latching flip-flop 18 receives the output waveform 44 on its input 46 and generates a digital output waveform 50 on its output 48. The latching flip-flop 18 is only triggered on the trailing edge of each pulse of the output waveform 44 (i.e., only when there is a phase shift in the optical DPSK input signal 22 data sequence. As a result, the digital output signal 50 from the latching flip-flop 18 represents a reconstruction of the bit sequence of the optical DPSK input signal 22.

Figure 3:
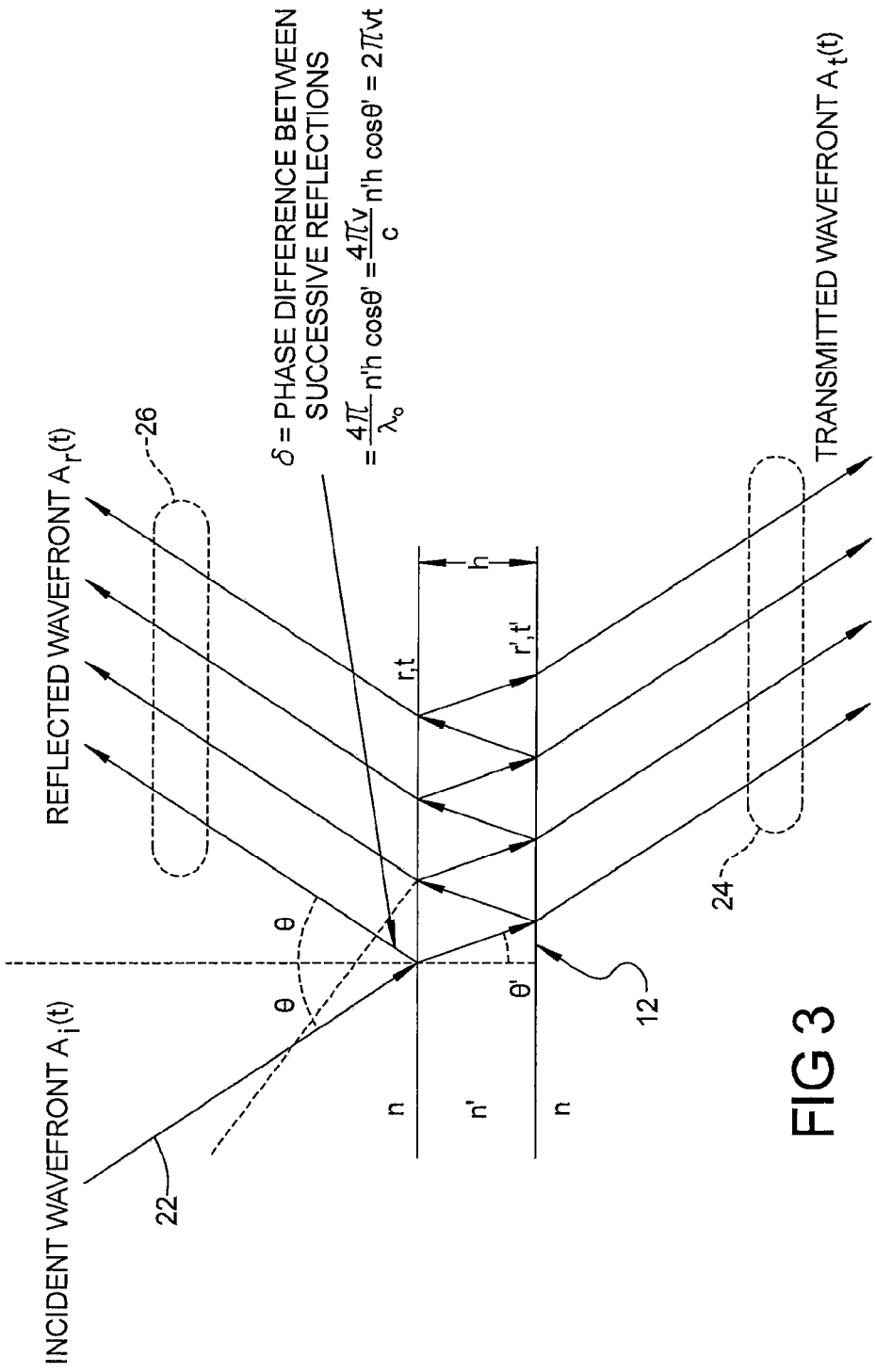
FIG. 3 is a diagram illustrating the phase shifts in the reflected signals produced by the etalon filter of FIG. 1.

The optical principle upon which use of the system 10 is predicated is based, in part, on an unconventional application of the transient shift in the transmission and/or reflection characteristics of the etalon filter 12 that occurs when the phase of the optical DPSK input signal 22 is shifted over a relatively short period of time. In general, the conventional application of a convention Fabry-Perot etalon filter is based on its steady state operation as depicted in FIG. 3. If δ is an integral multiple of 2π radians at the operational wavelength range of interest, the transmitted amplitude $A_t(t)$, to within the internal absorption limitations of the etalon filter 12, equals the incident amplitude $A_i(t)$, while the reflected amplitude $A_r(t)$ equals zero. This situation is dependent upon constructive interference of the reflecting wavefront component 24 internal to the etalon filter 12. Typically it is assumed that the phase of an electromagnetic wave varies continuously in space and time only due to propagation. However, if the phase $\phi(t)$ is shifted at the source, this additional phase term will affect the wavefront, or signal, transmitted ($A_t(t)$) through (i.e., transmitted wavefront component 24) and reflected ($A_r(t)$) from the etalon filter 12 (i.e., reflected wavefront component 26), as shown in Equations (1) and (2) below. The delayed phase terms in the summations occur as a result of the multiple reflections internal to the etalon filter 12.

Equation 1:

$$A_t(t) = tt' \exp(i\phi(t)) + tt' \sum_{k=1}^{\infty} r'^{2k} \exp\left(i\left(k\delta + \phi\left(t - \frac{(2k+1)hn'\cos\theta'}{c}\right)\right)\right) A_i(t) \rightarrow$$

$$\frac{tt' A_i(t)}{1 - r'^2 \exp(i\delta)}$$

for
$\phi = \text{constant} = 0$

Equation 2:

$$A_r(t) = \left[ r \exp(i\phi(t)) + \frac{tt'}{r'} \exp(-i\delta) \sum_{k=1}^{\infty} r'^{2k} \exp\left(i\left(k\delta + \phi\left(t - \frac{2khn'\cos\theta'}{c}\right)\right)\right) \right] \quad (2)$$

$$A_i(t) \rightarrow \left( r + \frac{tt'r'}{1 - r'^2 \exp(i\delta)} \right)$$

$$A_i(t) = -r'\left( \frac{1 - (r'^2 + tt')\exp(i\delta)}{1 - r'^2 \exp(i\delta)} \right)$$

for
$\phi = \text{constant} = 0$ where:
θ—angle of incidence of incoming wavefront;
$A_i(t)$; θ'—angle of refraction of wavefront inside of etalon filter;
n'—refractive index of etalon filter material;
n—refractive index of surrounding material;
r—reflection coefficient from outside of the etalon filter material;
r'=−r—reflection coefficient from inside of the etalon filter material;
t—transmission coefficient from outside into the etalon filter material;
t'=t—transmission coefficient from inside to outside of the etalon filter material;
h—thickness of the etalon filter;
$\lambda_o$—free space wavelength of wave;

c—free space speed of light; and $v=c/\lambda_o$—frequency of the optical input wave signal (i.e., signal 22).

Figure 4:
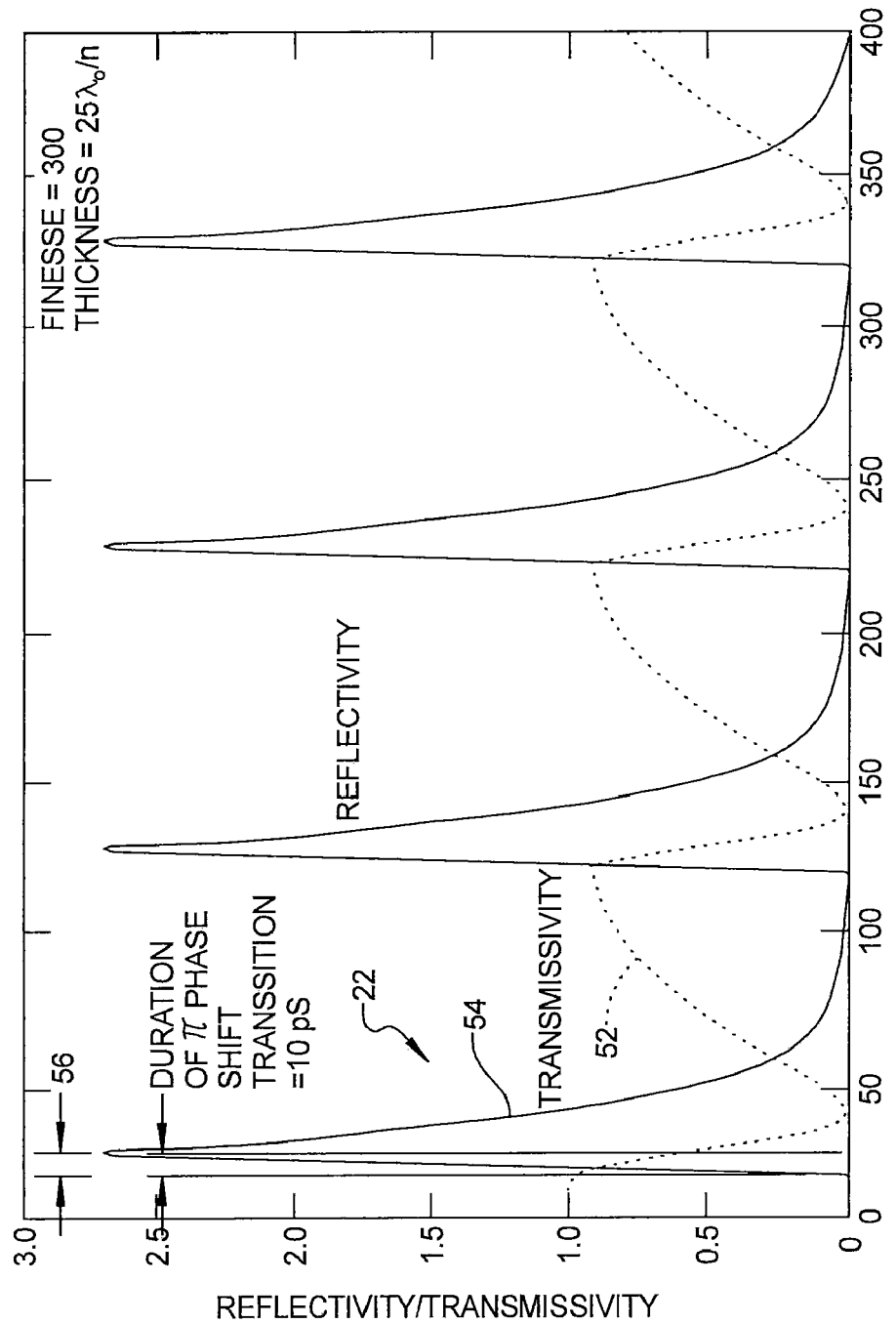
FIG. 4 is a graph that shows two curves representing the transmitted wavefront (dotted line) and the reflected wavefront (solid line) of an optical DPSK signal being filtered by an etalon filter, and illustrates how the energy of the reflected wavefront is released over a significantly shorter time period (in this example 10 picoseconds) than the time period corresponding to the switching frequency of the DPSK signal (in this example 100 picoseconds)
Figure 5:
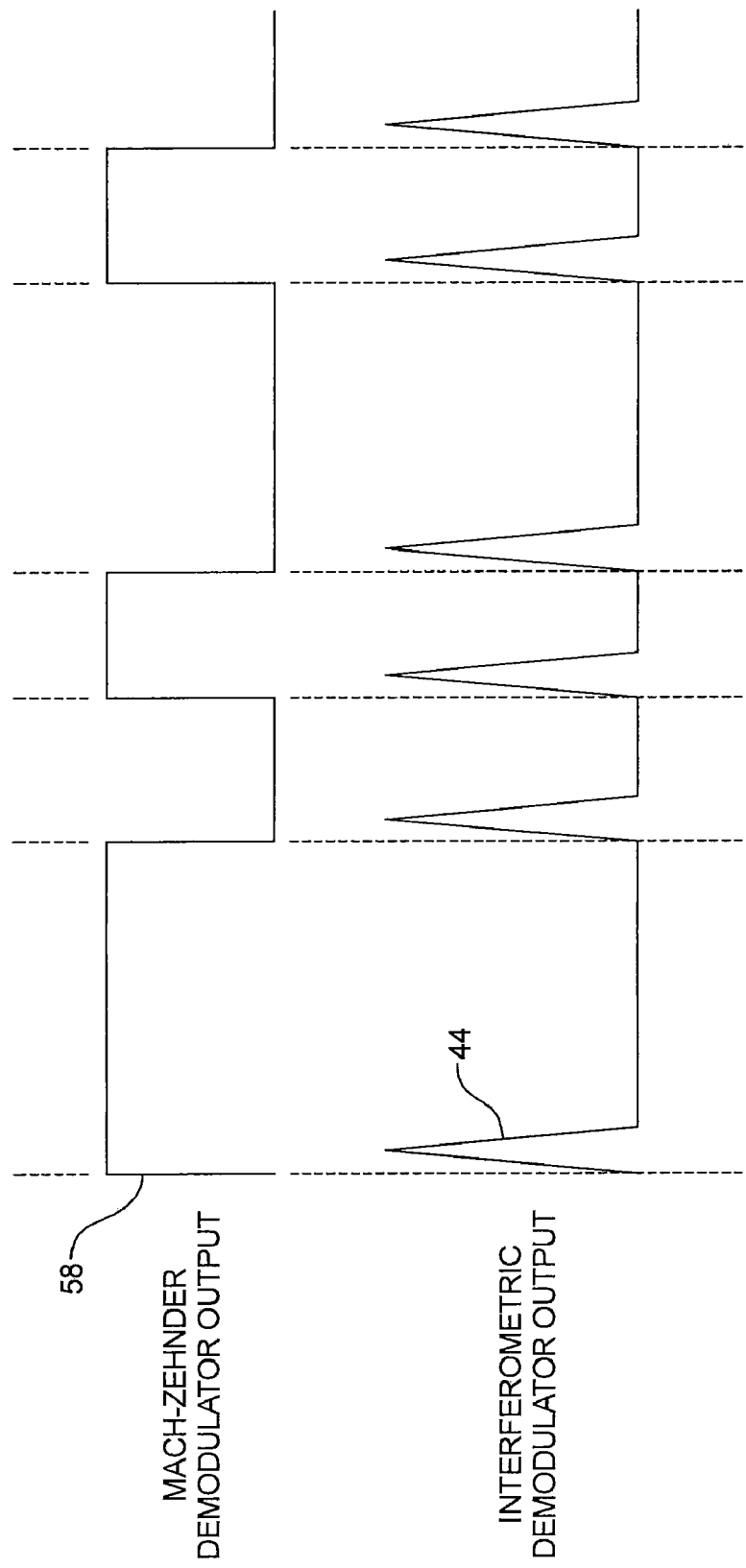
FIG. 5 illustrates two exemplary waveforms, one produced by a conventional Mach-Zehnder interferometer and the other produced by a optical DPSK demodulator of the present system and method.

FIG. 4 illustrates an exemplary optical input waveform 22 having a transmitted wavefront component, represented by waveform 52, and a reflected wavefront component, represented by waveform 54, where the phase of the optical input waveform 22 is reversed (shifted by π radians) every 100 picoseconds (pS). In this example waveform 52 corresponds to transmitted wavefront 24 in FIG. 1, and waveform 54 corresponds to reflected wavefront 26 in FIG. 1. Waveforms 52 and 54 also represent waveforms that are generated from the application of equations (1) and (2) given above. The phase transition occurs over a 10 pS interval, designated by reference numeral 56. It appears that the magnitude of reflectivity of the etalon filter 12 is substantially greater than 1, which is a physical impossibility for a passive device such as an etalon filter. This is explained by the fact that the etalon filter 12 actually releases its stored energy over a substantially shorter time interval than the 100 pS time interval (in this example) that the phase shifting occurs in. Thus, the signal surge represented by waveform 54 provides a significant signal-to-noise advantage for bit detection purposes and enables phase shifts in the optical DPSK input signal (i.e., the bit pattern) to be directly detected without bit-to-bit comparison. Thus, the system 10 does not require the two arms of conventional Mach-Zehnder interferometers to detect the phase shift in the optical DPSK input signal 22. Furthermore, the system 10 is much less susceptible to thermal conditions that affect the detectability of conventional Mach-Zehnder interferometers. In FIG. 5, the exemplary output waveform 44 produced by comparator 16 is presented in comparison to an exemplary output waveform 58 from a typical Mach-Zehnder interferometer.

Figure 6:
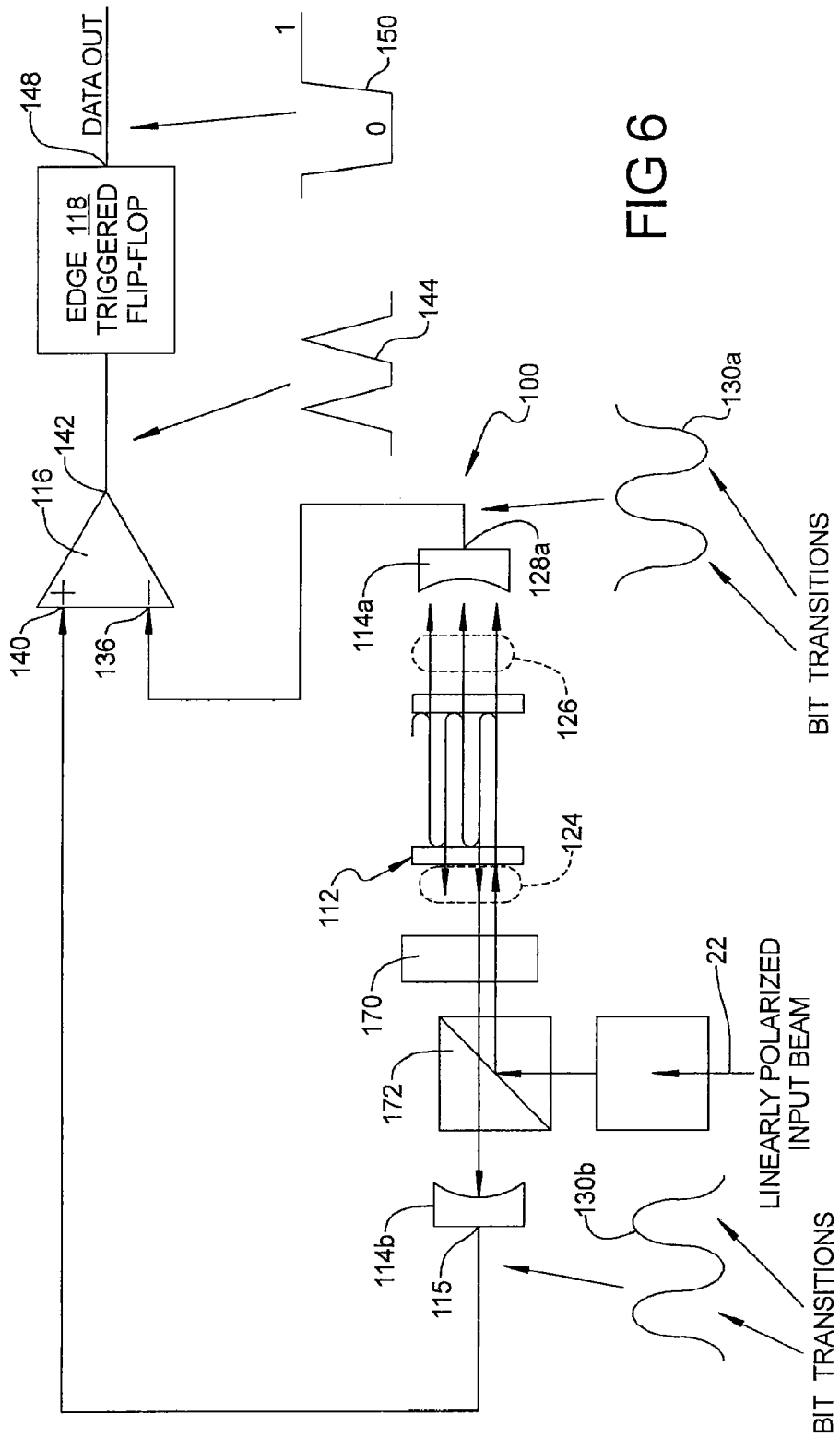
FIG. 6 is a block diagram of another embodiment of the system of the present disclosure that makes use of both the transmitted and reflected wavefront components of the optical DPSK input signal.

With brief reference to FIG. 6, a system 100 in accordance with other embodiments of the present disclosure is illustrated. The system 100 is similar in some respects to the system 10, and common components will be designated by reference numerals increased by 100 over those used in connection with the system 10.

The system 100 differs from the system 10 by making use of both the transmitted wavefront 126 and the reflected wavefront 124 from an etalon filter 112. The incoming optical DPSK-modulated beam 22 is linearly polarized so that it is reflected by a polarizing beam splitter 172. It passes through the Faraday rotator 170 and into the etalon filter 112. The transmitted wavefront 126 is received by one half of a differential detector 114a while the reflected wavefront 124 passes through the Faraday rotator 170 and the polarization beam splitter 172 to the other half of the differential detector 114b. The Faraday rotator 170 is a non-reciprocal device that rotates the polarization of a transmitted beam in the same sense relative to the direction of propagation. The thickness of the Faraday rotator 170 determines the amount of polarization. In this application the polarization is rotated by 45 degrees on each pass, in order that the reflected beam 124 from the etalon filter 122 is transmitted by the polarization beam splitter 172 to the second detector 114b.

The waveform produced at the output 128a of the first detector 114a illustrates the decreased-intensity pulse that occurs each time the detector 114a detects a phase shift in the transmitted wavefront 126. This waveform is indicated by waveform 130a. The second detector 114a produces an increased-intensity waveform 130b at its output 115 from the reflected wavefront 124 each time a phase shift occurs in the optical DPSK input signal 22. The output 128a from the first detector 114a and the output 115 from the second detector 114b are fed into the inputs of a comparator 116. When a phase shift occurs in the optical DPSK input signal 22, the signal on the non-inverting input 140 of the comparator 116 will be different than the magnitude of the signal on the inverting input 136, thus causing the comparator 116 to produce a signal 144 at its output 142. The signal 144 is used to drive a latching flip-flop 118 that produces a digital output signal 150 at its output 148 representative of the bit pattern of the optical DPSK input signal 22. Thus, the system 100 makes use of both the transmitted wavefront 126 and the reflected wavefront 124, and does not require a separate reference threshold input on the comparator 116. It will be appreciated that the propagation path lengths between the etalon filter 112 and the first detector 114a, and between the etalon filter 112 and the second detector 114b, will need to be matched to a fraction of the bit period (typically within about 5%) during initial construction and/or tuning of the system 100. Differential detectors with a variable optical delay on one input are commercially available. One such component is the "Balanced Photodiode Lab Buddy with Variable Optical Delay Line", commercially available from Discovery Semiconductors, Inc. of Ewing, N.J. The system 100 is expected to provide an even higher signal-to-noise ratio for the output signal 150 of the system 100.

The various embodiments and methods described herein thus enable the bit pattern of an optical DPSK input signal to be detected and reconstructed without the use of a conventional dual arm interferometer such as a Mach-Zehnder interferometer. The various embodiments and methods do not require any control loops to be constructed to account for thermal changes in the environment in which the demodulator is being used. The use of a Fabry-Perot etalon filter, which is significantly smaller in physical size than a conventional Mach-Zehnder interferometer, helps to significantly reduce the susceptibility of the filter to thermal changes that could affect performance. The use of a Fabry-Perot etalon filter also significantly simplifies the construction of a DPSK demodulator system, as well as potentially enabling the system to be used in applications and/or environments where significant thermal changes would render conventional Mach-Zehnder DPSK demodulators unreliable.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for demodulating an optical differential phase shift keyed (DPSK) input signal to obtain a bit pattern for the optical DPSK input signal, comprising:

an etalon filter for receiving an optical DPSK input signal and generating a transmitted wavefront component therefrom each time a phase shift occurs in said optical DPSK input signal; and a detector system for detecting said transmitted wavefront component to enable bit transitions in a data sequence of said optical DPSK input signal to be detected, and said optical DPSK input signal to be reconstructed as a digital output signal; the detector system including:

a comparator for comparing electrical signals generated in accordance with the transmitted wavefront and generating a series of pulses in response to changes in the transmitted wavefront, and a component for sensing edges of the series of pulses and generating the digital output signal.

2. The system of claim 1, wherein said detector system comprises a detector for converting a reflected wavefront component of said optical DPSK input signal into a corresponding electrical signal.

3. The system of claim 2, wherein said comparator having a first input and a second input, the first input receiving said corresponding electrical signal from said detector and said second input receiving a predetermined threshold signal, said comparator generating a digital output signal that changes state when said corresponding electrical signal exceeds said threshold signal.

4. The system of claim 3, wherein said component comprises a latching flip-flop for receiving said digital output signal from said comparator and generating a digital bit pattern representative of said optical DPSK input signal.

5. The system of claim 1, wherein said detector system includes:
    a first detector for detecting the transmitted wavefront component of said optical DPSK input signal and generating a corresponding first electrical signal;
    a second detector for detecting a reflected wavefront component of said optical DPSK input signal and generating a corresponding second electrical signal; and
    wherein said comparator receives said transmitted first and second electrical signals and detecting therefrom a change in state of said bit pattern of said optical DPSK input signal.

6. The system of claim 5, further comprising a latching flip-flop for receiving an output from said comparator and generating said digital output signal.

7. A method for demodulating an optical differential phase shift keyed (DPSK) input signal to obtain a bit pattern for the optical DPSK input signal, the method comprising:
    using an etalon filter to receive an optical DPSK input signal;
    using said etalon filter to generate an optical wavefront component from said optical DPSK input signal each time a phase shift occurs in said optical DPSK input signal; and
    from said optical wavefront component, using a comparator to sense bit transitions in said bit pattern of said optical DPSK input signal; and
    from said sensed bit transitions, using a component responsive to the comparator to generate a digital output signal representative of said optical DPSK input signal.

8. The method of claim 7, wherein said comparator compares an electrical signal generated by said etalon filter to a reference threshold signal, before generating an output signal.

9. The method of claim 8, wherein said using a component comprises using a logic component, and further comprising using an output of said comparator to drive the logic component so that the logic component generates a digital output signal in accordance with said detected bit transitions.

10. The method of claim 7, wherein said using an etalon filter comprises:
    using a first detector for detecting a transmitted wavefront component of said optical DPSK input signal and generating a corresponding first electrical signal;
    using a second detector for detecting a reflected wavefront component of said optical DPSK input signal and generating a corresponding second electrical signal; and
    comparing said first and second electrical signals and detecting therefrom a change in state of said bit pattern of said optical DPSK input signal.

11. The method of claim 10, wherein comparing said first and second electrical signals further comprises using a flip-flop to generate said digital output signal.

12. A method for demodulating an optical differential phase shift keyed (DPSK) input signal to obtain a bit pattern for the optical DPSK input signal, the method comprising:
    using an etalon filter to receive an optical DPSK input signal;
    using said etalon filter to generate an optical wavefront component from said optical DPSK input signal each time a phase shift occurs in said optical DPSK input signal;
    using a detector to generate a first electrical signal from said wavefront component;
    using a comparator to receive said first electrical signal and to compare said first electrical signal against a reference threshold signal, and to generate a second electrical signal when said first electrical signal meets a predetermined condition relative to said threshold signal that signals that an occurrence of a phase shift in said optical DPSK input signal; and
    using said second electrical signal to trigger a logic component, the logic component generating a digital output signal indicative of said bit pattern of said optical DPSK input signal.

13. The method of claim 12, wherein said using said etalon filter comprises using said etalon filter to generate a transmitted optical wavefront component from said optical DPSK input signal each time a phase shift occurs in said optical DPSK input signal.

14. The method of claim 13, wherein:
    using an etalon filter comprises generating a transmitted wavefront component and a reflected wavefront component from said optical DPSK input signal;
    using a detector comprises using a pair of detectors to generate a pair of first electrical signals; and
    wherein said using a comparator comprises using both of said first electrical signals to determine when a phase shift occurs in said optical DPSK input signal.

15. The method of claim 14, further comprising using a polarizing beam splitter to reflect said optical DPSK input signal into said etalon filter, and to enable said reflected wavefront component of said optical DPSK input signal from said etalon filter to be directed into one of said detectors.

16. The method of claim 15, further comprising a Faraday rotator for rotating the polarization of said DPSK input signal after said input signal has been linearly polarized, by 45 degrees per pass, in order that a wavefront thereof that is reflected from the etalon filter is able to pass through the polarizing beam splitter to the second detector.

* * * * *